3,137,704
α-COPPER-PHTHALOCYANINE PREPARATION

Hans Raab, Leverkusen, and Reinhold Hörnle, Cologne-Flittard, Germany, assignors to Farbenfabriken Bayer Aktiengesellschaft, Leverkusen, Germany, a corporation of Germany
No Drawing. Filed May 9, 1961, Ser. No. 108,753
Claims priority, application Germany May 11, 1960
2 Claims. (Cl. 260—314.5)

The present invention is concerned with a process for the production of the α-modification of copper phthalocyanine. More particularly it concerns a process for the production of a strongly colored α-modification of copper phthalocyanine.

In the grinding of copper phthalocyanine of the coarse-crystalline, weakly-colored β-form, such as is obtained by the production from phthalic anhydride in a solvent, with water-soluble inorganic salts, such as sodium chloride, sodium sulfate, calcium chloride, or with organic water-soluble materials, such as sugar, oxalic acid or phthalic anhydride, the fine crystalline α-form is generally obtained. The pigment so obtained differs, after removal of the water-soluble grinding adjuvant and drying, from the starting product by a state of fine division and increased color strength. Furthermore, the color shade is shifted towards the red end of the spectrum (c.f. U.S. patent specification Nos. 2,402,167 and 2,556,728, page 2).

However, the color strength, such as is obtained by a pasting of the copper phthalocyanine from concentrated sulfuric acid, subsequent washing until neutral and drying, is not achieved by this salt grinding.

If, in the above-described salt grinding organic solvents in solid or liquid form are added to the grinding mixture, then according to previously known experimental results there is obtained completely or preponderantly the greenish β-form of the copper phthalocyanine which is obtained, in comparison with the starting material, in a finely divided state and, therefore, considerably more strongly colored. As suitable organic additives there have been recommended, inter alia, liquid hydrocarbons, such as toluene, xylene and tetrahydronaphthalene (U.S. specification 2,556,730), chlorinated hydrocarbons, such as tetrachloroethane, tetrachloroethylene and trichlorobenzene, as well as alcohols, such as methanol, ethanol and isopropanol, and ketones, such as acetone (U.S. specifications No. 2,556,726 and 2,556,728). Furthermore, there has been recommended as additive to the salt grinding, dioxan, ethylene glycol monoethyl ether and aliphatic amides such as dimethyl formamide (U.S. specification No. 2,556,726), the use of which leads exclusively to the β-form of the copper phthalocyanine. The number of the suitable organic additives for the same purpose were further increased by the solid hydrocarbons and their halogen, nitro and alkoxy substitution products, such as naphthalene, diphenyl and p-nitrotoluene (U.S. specification No. 2,791,589). Water-insoluble organic liquids with long aliphatic chains have also been used for this purpose, such as higher fatty acids, higher aliphatic alcohols and esters of fatty acids (British specification No. 569,402).

Even when, in the case of the mentioned grinding processes in the presence of organic solvents, one starts from the α-form, it changes under the influence of the mentioned solvents into the β-form of the copper phthalocyanine.

We have now found that in the salt-grinding of copper phthalocyanine the formation of the α-modification in strongly colored form can be caused when, instead of the above-mentioned organic solvents, there are added halogenated alcohols or cyano alcohols or their esters with inorganic or organic acids. This result is particularly surprising since not only alcohols but also many halogenated organic compounds, so far as was previously known, preponderantly lead to the β-form of the copper phthalocyanine.

Examples of additives which may be used are 2-chloro- or -bromoethanol, 2-fluoroethanol, 2-cyanoethanol, 4-chlorobutanol, 6-chlorohexanol, 2-chlorocyclohexanol, trichloroethyl phosphate, 2-chloroethyl acetate, 3-chloro-2-hydroxypropanol-1, trichloroethanol, trifluoroethanol and others. The organic additives (halogenated alcohols, cyano alcohols or their esters) are advantageously used in an amount of 4 to 16 percent calculated on the quantity of copper phthalocyanine pigment; the preferred quantity ranges from 5 to 10 percent of organic additives referred to the weight of pigment used.

The other grinding adjuvants are sufficiently known from literature. There may be particularly mentioned sodium chloride, sodium sulfate, ferrous sulfate, sodium carbonate, sodium bicarbonate and ammonium chloride.

The halogenated alcohols or cyano alcohols or their esters may be liquid or solid and can be added to the grinding mixture not only at the beginning but also in an advanced stage of the grinding process.

During the grinding, care must be taken that temperature of the contents of the mill does not rise too far; large amounts are expediently cooled. At temperatures over 70 to 80° C. an appreciably amount of the finely-divided β-modification is easily formed instead of α-modification.

The following examples are given for the purpose of illustrating the present invention without, however, restricting it thereto.

Example 1

4 g. of copper phthalocyanine, such as is obtained by the production from phthalic anhydride in a solvent, 20 g. of anhydrous sodium sulfate and 0.4 g. ethylene chlorohydrin are ground together for 30 hours in a ball mill with a capacity of 200 millilitres. By external cooling with water, the temperature is kept below 30° C., e.g. at room temperature. After the usual working-up, finely-divided, very strongly colored copper phthalocyanine, which consists entirely of the α-form, is obtained.

Equal good results will be obtained if in the preceding working method 0.4 part by weight of ethylene chlorohydrin are replaced by 0.2 to 0.35 part by weight of methylene chlorohydrin or are replaced by 0.2 to 0.4 part by weight of the following compounds:

Cl·CH₂·CH₂·OH             Br·CH₂·CH₂·OH
F·CH₂·CH₂·OH              NC·CH₂·CH₂·OH
Cl·CH₂·CH₂·CH₂·CH₂·OH     Cl·CH₂·CH₂·CH₂·CH₂·CH₂·CH₂·OH

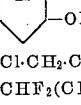   Cl·CH₂·CHOH·CH₂·OH

Cl·CH₂·CHOH·CH₂Cl         Br·CH₂·CHBr·CH₂OH
CHF₂(CF₂)₃·CH₂OH          Cl₃C·CH₂OH
F₃C·CH₂OH                 CO(OCH₂CH₂Cl)₂
CH₃·COO·CH₂CH₂Cl          Cl·CH₂·COO·CH₂CH₂Cl
CH₃—(CH₂)₇—CH=CH—(CH₂)₇·COOCH₂CH₂Cl

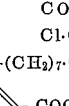

ClCH₂CH₂OSO₃H             Cl·CH₂CH₂CH₂CH₂O·SO₂CH₃
O=P(OCH₂CH₂Cl)₃           O=P(OCH₂C·Cl₃)₃

Example 2

40 g. of the β-modification of the copper phthalocyanide, 200 g. of anhydrous sodium sulfate and 4 g. of 2-bromoethanol are ground at about 40 to 50° C. for 30 hours, without cooling, in a ball mill of 5 litres capacity. After the usual working-up a product is obtained similar to that of Example 1.

Instead of 2-bromoethanol, 2-cyanoethanol can be used with the same result.

*Example 3*

40 g. of the β-modification of copper phthalocyanine, 200 g. of anhydrous sodium sulfate, 4 g. of 2-chloroethanol and 0.4 g. silicone oil (dimethyl polysiloxane) are ground, without cooling, in a 5 litre ball mill with 6 kg. of grinding bodies. A product is obtained which is more strongly colored than that of Example 1.

If in Example 2 the bromoethanol is replaced by 2-chloroethyl acetate or trichloroethyl phosphate and the anhydrous sodium sulfate by sodium chloride, then analogous results are obtained. By the use of 3-chloropropan-1,2-diol, 1,3-dichloro-propan-2-ol, di-(β-chloroethyl) carbonate, di-(β-chloroethyl)-sulfite

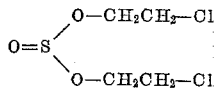

or β-chloroacetic acid-β-chloroethylester similar good results are obtained.

What we claim is:

1. In a process for producing a strongly-colored alpha-copper phthalocyanine by grinding at least one copper phthalocyanine pigment selected from the class consisting of beta-copper phthalocyanine and weakly-colored alpha-copper phthalocyanine, in the presence of a solid grinding adjuvant, the improvement which consists in grinding the copper phthalocyanine pigment in the presence of at least one organic additive selected from the class consisting of a halogeno alcohol, a cyano alcohol, and an ester thereof, said alcohol moiety having 2 to 6 carbon atoms with not more than one hydroxy group 3-chloro-2-hydroxypropanol-1, effecting the grinding under dry milling conditions at a temperature not exceeding about 70° C.

2. In a process for producing a strongly-colored alpha-copper phthalocyanine by grinding at least one copper phthalocyanine pigment selected from the class consisting of β-copper phthalocyanine and weakly-colored alpha-copper phthalocyanine, in the presence of a solid grinding adjuvant, the improvement which consists of grinding the copper phthalocyanine pigment in the presence of at least one organic additive selected from the group consisting of 2-chloroethanol; 2-bromoethanol; 2-fluoroethanol; 2-cyanoethanol; 4-chlorobutanol; 6-chlorohexanol; 2-chlorocyclohexanol; 3 - chloro-2-hydroxypropanol-1; 2,3-dibromopropanol - 1; 2,3-dichloropropanol-2; 2,2,3,3,4,4,5,5-octa-fluoropentanol-1; 2,2,2 - trichloroethanol; 2,2,2-trifluoroethanol; di-(β-chloroethyl) carbonate; β-chloroethyl acetate; β-chloroacetic acid-(β-chloroethyl)-acetate; oleic acid β-chloroethyl ester; tri-(β-tri-chloroethyl)-phosphate; tri - (β - monochloroethyl)-phosphate; β-chloroethyl sulfate; 1-(methylsulfonylhydroxy) - 4-chlorobutane; di-β-chloroethyl sulfite; terephthalic acid-bis-β - chloroethylester; trichloroethyl phosphate; and trichloroethanol.

References Cited in the file of this patent
UNITED STATES PATENTS

| | | |
|---|---|---|
| 2,686,010 | Wettstein | Aug. 10, 1954 |
| 2,982,666 | Chun et al. | May 2, 1961 |

FOREIGN PATENTS

| | | |
|---|---|---|
| 855,098 | Great Britain | Nov. 30, 1960 |